United States Patent
Ding

(10) Patent No.: US 10,198,050 B2
(45) Date of Patent: Feb. 5, 2019

(54) DATA TRANSFERRING METHOD BASED ON PROTECTION AND CONTROL SYSTEM FOR INTELLIGENT SUBSTATION

(71) Applicant: Kyland Technology Co., Ltd., Beijing (CN)

(72) Inventor: Yuqi Ding, Beijing (CN)

(73) Assignee: Kyland Technology Co., Ltd, Beijing (CN)

( * ) Notice: Subject to any disclaimer, the term of this patent is extended or adjusted under 35 U.S.C. 154(b) by 160 days.

(21) Appl. No.: 15/404,511

(22) Filed: Jan. 12, 2017

(65) Prior Publication Data

US 2018/0088642 A1 Mar. 29, 2018

(30) Foreign Application Priority Data

Sep. 29, 2016 (CN) .......................... 2016 1 0866118

(51) Int. Cl.
*H02J 13/00* (2006.01)
*G06F 1/26* (2006.01)
(Continued)

(52) U.S. Cl.
CPC ............ *G06F 1/26* (2013.01); *H02J 13/0062* (2013.01); *H04L 41/069* (2013.01);
(Continued)

(58) Field of Classification Search
CPC .................................................. H02J 13/0062
See application file for complete search history.

(56) References Cited

U.S. PATENT DOCUMENTS

2012/0236875 A1* 9/2012 Vijayasankar ........... H04B 3/54
370/458
2013/0262922 A1* 10/2013 Song ...................... H02H 7/261
714/14
(Continued)

FOREIGN PATENT DOCUMENTS

CN 103683502 A 3/2014
CN 103887885 A 6/2014
(Continued)

OTHER PUBLICATIONS

Durand-Schaefer, R; European Search Report; European Patent Application No. EP 16207225, dated May 17, 2017, 20 pages, European Patent Office, Munich Germany.
(Continued)

*Primary Examiner* — Albert Wang
(74) *Attorney, Agent, or Firm* — Crain, Caton and James

(57) ABSTRACT

The disclosure relates to a data transferring method based on a protection and control system for an intelligent substation. Merging unit and intelligent terminal integrated devices for all bays in an intelligent substation are respectively accessed to corresponding transport ports of an FPGA access chip of an intelligent power server. The method includes: in a reception period, messages are read from a reception buffer clip by a real-time business central processor, subjected to a process and then written into the reception buffer clip; in a transmission period, the real-time business central processor issues indication information to the FPGA access chip, causing the chip to generate messages according to the indication information and write the messages into a transmission buffer.

13 Claims, 2 Drawing Sheets

(51) Int. Cl.
*H04L 29/08* (2006.01)
*H04L 12/24* (2006.01)
*H04L 12/853* (2013.01)
*H04Q 9/02* (2006.01)

(52) U.S. Cl.
CPC .......... *H04L 47/2416* (2013.01); *H04L 67/12* (2013.01); *H04Q 9/02* (2013.01); *H04Q 2209/826* (2013.01)

(56) References Cited

U.S. PATENT DOCUMENTS

2014/0074415 A1   3/2014   Rundolph
2017/0070336 A1*  3/2017   Chen .................. H02H 7/261

FOREIGN PATENT DOCUMENTS

| CN | 104008214 A | 8/2014 |
| CN | 104319878 A | 1/2015 |
| JP | 2004072905 A | 3/2004 |
| JP | 200867595 A | 3/2008 |

OTHER PUBLICATIONS

Chen X Inzhi, Ye Pinyong, Wei Jangong, Yu Huawu, Pan Ke, Implementation of multi-port Ethernet interface preprocessor board for IEC61850 process bus, 2011, 6 pages, The International Conference on Advanced Power System Automation and Protection, China.

* cited by examiner

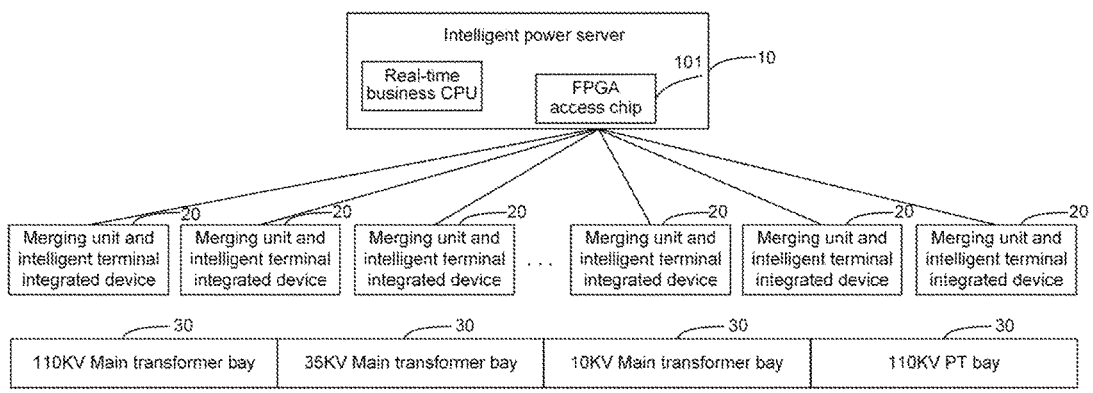

FIG. 1

| In a reception period of a real-time business central processing unit of the intelligent power server, SV messages or GOOSE messages transmitted by each merging unit and intelligent terminal integrated device are read by the real-time business central processing unit from each reception buffer clip of the FPGA access chip, the SV messages or GOOSE messages are received from each of the transport ports by the FPGA access chip, subjected to SV processing or GOOSE processing and then written into corresponding reception buffer clips in the reception buffer | ──S210 |

↓

| In a transmission period of the real-time business CPU, the real-time bussiness CPU issues indication information generated in a measurement and control process and/or a protection process to the FPGA access chip, causing the FPGA access chip to generate the GOOSE messages according to the indication information and write the GOOSE messages into a transmission buffer of the FPGA access chip | ──S220 |

FIG. 2

DATA TRANSFERRING METHOD BASED ON PROTECTION AND CONTROL SYSTEM FOR INTELLIGENT SUBSTATION

CROSS-REFERENCE TO RELATED APPLICATIONS

This application claims priority to Chinese patent application No. 201610866118.1, filed on Sep. 29, 2016, which is incorporated by reference herein in its entirety.

TECHNICAL FIELD

The embodiments of the disclosure relate to the technical field of intelligent substations, and in particular relate to a data transferring method based on a protection and control system for an intelligent substation.

BACKGROUND

An intelligent substation is a substation having primary and secondary devices of the substation as intelligent objects, and capable of realizing information sharing and interoperation by standardizing intelligent information based on a high-speed network communication platform and also capable of realizing automation functions such as measurement monitoring, control and protection, information management and the like based on network data.

The intelligent substation includes a station level, a bay level and a process level, and effective contact is mainly performed among different levels through optical cables. Each level includes different systems, devices and apparatuses which co-act and are cooperated with one another. The bay level mainly includes secondary devices such as a measurement and control apparatus and a protection apparatus, and completes measurement, control and protection of the devices on the process level by analyzing sampled value (SV) messages or generic object oriented substation events (GOOSE) messages transmitted by a merging unit and intelligent terminal integrated device.

In the related art, the substation is divided into a high-voltage line part, a main transformer part and a medium voltage side part, and each part is divided into different device bays. Because the protection apparatuses are classified according to the device bays divided by functions, a plurality of types of protection apparatuses may exist in each bay of the substation, and therefore, lots of messages are generated. In the related art, real-time reception and transmission of the above lots of messages cannot be met, and the message transmission efficiency is relatively low, thereby influencing operating efficiency of the substation.

SUMMARY

In view of this, the embodiments of the disclosure provide a data transferring method based on a protection and control system for an intelligent substation, so that the technical problems in the related art that lots of messages cannot be processed in real time and message transmission efficiency is relatively low are solved.

The embodiments of the disclosure provide a data transferring method based on a protection and control system for an intelligent substation, merging unit and intelligent terminal integrated devices for all bays in the intelligent substation are directly accessed into an intelligent power server, each of the merging unit and intelligent terminal integrated devices is accessed to one of transport ports of a field-programmable gate array (FPGA) access chip on the intelligent power server through an embedded high-bandwidth switched communication network, and the merging unit and intelligent terminal integrated devices and the transport ports are in a relationship of one-to-one correspondence, and the intelligent power server is configured to realize all functions of measurement and control, protection, switching and telecontrol in the intelligent substation, and the method includes:

in a reception period of a real-time business central processor of the intelligent power server, reading sampled value SV messages or generic object oriented substation events GOOSE messages transmitted by each of the merging unit and intelligent terminal integrated devices from each reception buffer clip of the FPGA access chip by the real-time business central processor, the SV messages or GOOSE messages are received from each of the transport ports by the FPGA access chip, subjected to a SV processing or GOOSE processing, and then written into corresponding reception buffer clips in a reception buffer, the reception buffer clips and the transport ports are in a relationship of one-to-one correspondence;

in a transmission period of the real-time business central processor, issuing indication information generated in a measurement and control process and/or a protection process to the FPGA access chip by the real-time business central processor, causing the FPGA access chip to generate the GOOSE messages according to the indication information and write the GOOSE messages into a transmission buffer of the FPGA access chip.

According to the data transferring method based on the protection and control system for an intelligent substation provided by the embodiments of the disclosure, merging unit and intelligent terminal integrated devices for all bays in the intelligent substation are respectively accessed to corresponding transport ports of the FPGA access chip of the intelligent power server. In the reception period, messages are read from each reception buffer clip of the FPGA access chip, subjected to a process and then written into the reception buffer clips. In the transmission period, the real-time business central processor issues the indication information to the FPGA access chip, causing the chip to generate the messages according to the indication information and write the messages into a transmission buffer. With the above technical solution, since the FPGA access chip has a plurality of high-speed transport ports, real-time reception and transmission of the messages can be guaranteed, thereby improving the message transmission efficiency and further improving data transferring efficiency of the intelligent substation.

BRIEF DESCRIPTION OF DRAWINGS

In order to more clearly describe the technical solution of exemplary embodiments of the disclosure, the drawings to be used in descriptions of the embodiments should be simply introduced below. Apparently, the introduced drawings are only drawings of a part of embodiments to be described in the disclosure, but not all of drawings. Those ordinary skilled in the art may obtain other drawings according to the drawings without paying any creative work.

FIG. 1 is a schematic diagram showing a structure of an intelligent substation provided by embodiment I of the disclosure;

FIG. 2 is a schematic diagram showing a flow of a data transferring method based on a protection and control system for an intelligent substation provided by embodiment I of the disclosure.

DETAILED DESCRIPTION

Figure 3:
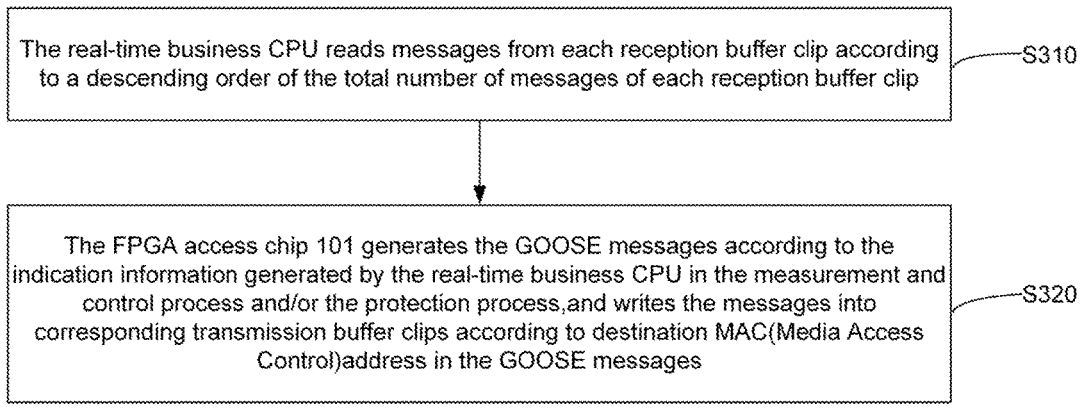
FIG. 3 is a schematic diagram showing a flow of a data transferring method based on a protection and control system for an intelligent substation provided by embodiment II of the disclosure.

The disclosure is further described below in details by combining the drawings and embodiments. It should be understood that, the embodiments described herein are only used for illustrating the disclosure, not limiting the disclosure. In addition, it should be noted that, in order to conveniently describe, only parts of contents related to the disclosure, but not all the contents, are illustrated in the drawings.

It should be mentioned that, some exemplary embodiments are described to serve as processing or methods described in the flow diagrams before the exemplary embodiments are discussed in details. Although various operations (or steps) are described into sequential processing in the flow diagram, many operations therein can be implemented concurrently, concomitantly or simultaneously. In addition, a sequence of the various operations can be rearranged. The processing can be ended when the operations thereof are completed, however, the processing may also include additional steps which are not illustrated in the drawings. The processing can correspond to methods, functions, procedures, subroutines, subprograms and the like.

Embodiment I

FIG. 1 is a schematic diagram showing a structure of an intelligent substation provided by embodiment I of the disclosure. FIG. 2 is a schematic diagram showing a flow of a data transferring method based on a protection and control system for an intelligent substation provided by embodiment I of the disclosure. The data transferring method based on the protection and control system for an intelligent substation provided by the embodiments of the disclosure can be applied to an intelligent substation system shown in FIG. 1. As shown in FIG. 1, the intelligent substation can include an intelligent power server 10, merging unit and intelligent terminal integrated devices 20 and bays 30.

Merging unit and intelligent terminal integrated devices 20 for all bays 30 in the intelligent substation are directly accessed to the intelligent power server 10. According to the disclosure, each merging unit and intelligent terminal integrated device 20 is accessed to one of transport ports of a FPGA access chip 101 on the intelligent power server merely through a physical link, and all protection and measurement and control of primary devices connected to the merging unit and intelligent terminal integrated devices are realized by the intelligent power server 10.

The merging unit and intelligent terminal integrated devices 20 for all bays in the intelligent substation are directly accessed to the intelligent power server 10, each merging unit and intelligent terminal integrated device is accessed to one of transport ports on the intelligent power server through an embedded high-bandwidth switched communication network. Data of the process level is collected in real time by the intelligent power server in a manner of accessing each merging unit and intelligent terminal integrated device to the transport port on the intelligent power server through the embedded high-bandwidth switched communication network, real-time data processing of the collected process level data is completed, and all the protection and measurement and control of the primary devices connected to the merging unit and intelligent terminal integrated devices are realized. Specifically, the embedded high-bandwidth switched communication network may be a controller area network (CAN) bus, a field Internet protocol (IP) bus, a Modbus bus, a process field bus (Profibus), a highway addressable remote transducer (HART) open communication protocol bus, a Foundation Feildbus (FF) field bus or an optical fiber.

Illustratively, each merging unit and intelligent terminal integrated device 20 is accessed to a transport port on the intelligent power server 10 merely through a physical link. Specifically, each merging unit and intelligent terminal integrated device is connected to a transport port of the intelligent power server merely through a pair of optical fibers. One transport port of the intelligent power server includes a reception port and a transmission port, each merging unit and intelligent terminal integrated device is accessed to the reception port of the transport port on the intelligent power server through one optical fiber, and the merging unit and intelligent terminal integrated device is accessed to the transmission port of the transport port on the intelligent power server through another optical fiber. The process level data is collected in real time by the intelligent power server merely through one physical link. For example, the SV messages and GOOSE messages transmitted by the merging unit and intelligent terminal integrated devices are collected, and the process level data collected in real time is processed in real time, thereby realizing the protection and measurement and control of the primary devices connected to the merging unit and intelligent terminal integrated devices.

However, a merging unit and intelligent terminal integrated device in the traditional substation needs to be accessed to a plurality of different physical apparatuses, and the measurement and control and protection of the primary devices connected to the merging unit and intelligent terminal integrated device are respectively realized through these different physical apparatuses.

The intelligent power server 10 can include the FPGA access chip 101. The FPGA access chip 101 can be provided with 16 high-speed transport ports, such as 100M Ethernet transport ports, to access to the merging unit and intelligent terminal integrated devices 20 through the high-speed transport ports. The FPGA access chip 101 can further include a reception buffer and a transmission buffer. In addition, a plurality of reception buffer clips are included in the reception buffer, a plurality of transmission buffer clips are included in the transmission buffer, and each transport port corresponds to a reception buffer clip/a transmission buffer clip. The bays 30 can include main transformer bays, line bays and bus bays, such as a 110 KV main transformer bay, a 35 KV main transformer bay, a 10 KV main transformer bay and a 110 KV PT bay, and each bay 30 includes at least one merging unit and intelligent terminal integrated device 20.

Each merging unit and intelligent terminal integrated device 20 is accessed to one of transport ports of the FPGA access chip 101 on the intelligent power server merely through one physical link, and each transport port of the FPGA access chip 101 on the intelligent power server is only connected to one merging unit and intelligent terminal integrated device, that is, the merging unit and intelligent terminal integrated devices 20 and the transport ports on the FPGA access chip 101 are in a relationship of one-to-one correspondence. Because each transport port corresponds to one reception buffer clip/transmission buffer clip, each merging unit and intelligent terminal integrated device 20 corresponds to one reception buffer clip/transmission buffer clip. The intelligent power server 10 can be used for realizing all function of measurement and control, protection, switching and telecontrol in the intelligent substation.

As shown in FIG. 2, the data transferring method based on the protection and control system for an intelligent substation can include steps described below.

In S210, in a reception period of a real-time business central processing unit of the intelligent power server, SV messages or GOOSE messages transmitted by each merging unit and intelligent terminal integrated device are read by the real-time business central processing unit from each reception buffer clip of the FPGA access chip. The SV messages or GOOSE messages are received from each of the transport ports by the FPGA access chip, subjected to SV processing or GOOSE processing and then written into corresponding reception buffer clips in the reception buffer, and the reception buffer clips and the transport ports are in a relationship of one-to-one correspondence.

Illustratively, the intelligent power server 10 can include the real-time business central processing unit (CPU), and the real-time business CPU can be used for real-time businesses on the intelligent power server 10, such as message transfer businesses. Optionally, the businesses of transferring messages by the real-time business CPU can include a reception period and a transmission period.

The reception buffer is divided into a plurality of reception buffer clips by the FPGA, and each Ethernet transport port of the FPGA corresponds to one reception buffer clip, that is, one merging unit and intelligent terminal integrated device 20 corresponds to one reception buffer clip. The FPGA detects message reception of each Ethernet transport port in real time. When there are messages at one transport port, the messages are received by the FPGA access chip 101 from the transport port, subjected to the SV processing or GOOSE processing and then written into corresponding reception buffer clips in the reception buffer.

In the reception period, the SV messages or GOOSE messages transmitted by each merging unit and intelligent terminal integrated device 20 are read by the real-time business CPU from each reception buffer clip of the FPGA access chip 101.

In S220, in a transmission period of the real-time business CPU, indication information generated in a measurement and control process and/or a protection process is issued to the FPGA access chip by the real-time business CPU, causing the FPGA access chip to generate GOOSE messages according to the indication information and then write the GOOSE messages into the transmission buffer of the FPGA access chip.

Illustratively, because the intelligent power server 10 can realize the measurement and control function and the protection function, the real-time business CPU in the intelligent power server 10 may generate the indication information for the primary devices in the measurement and control process and/or the protection process. Therefore, the indication information can be issued to the FPGA access chip 101 by the real-time business CPU in the transmission period, causing the FPGA access chip 101 to generate GOOSE messages according to the indication information, and the generated GOOSE messages are written into the transmission buffer of the FPGA access chip 101.

Optionally, a duration of the reception period of the real-time business CPU is greater than a duration of the transmission period.

It should be understood that, the real-time business CPU reads the SV messages or GOOSE messages from the reception buffer of the FPGA access chip 101 in the reception period, that is, the real-time business CPU periodically queries the reception buffer of the FPGA access chip 101 in the reception period. The GOOSE messages issued to the merging unit and intelligent terminal integrated device 20 by the intelligent power server 10 are written into the transmission buffer of the FPGA access chip 101 in the transmission period. Because message traffic received from process level devices is greater than message traffic transmitted to the process level devices, messages of the process level devices are preferably received, thereby reducing reception delay. Therefore, the duration of the reception period can be set to be greater than the duration of the transmission period, so that all the messages can be received in the reception period, thereby avoiding information loss due to incomplete and inadequate message reception caused by a short reception period.

The FPGA access chip 101 detects messages at each Ethernet transport port in real time. When there exists messages at the Ethernet transport ports, the FPGA access chip 101 reads the messages into a local reception buffer and increases a total number of the messages in the reception buffer clip by one. After one message is read by the real-time business CPU from the reception buffer clip, the FPGA access chip 101 decreases one from the total number of the messages in the reception buffer clip, and reports the total number of the messages in each reception buffer clip to the real-time business CPU in real time in the reception period. Meanwhile, the FPGA access chip 101 detects whether the transmission buffer is empty in real time. If the transmission buffer is not empty, the GOOSE messages are written into corresponding Ethernet transport ports according to destination addresses of the GOOSE messages and transmission instructions are also written into corresponding Ethernet transport ports, by the FPGA access chip 101. All the Ethernet transport ports may simultaneously work, and messages can be written into a plurality of Ethernet transport ports at a time.

According to the data transferring method based on the protection and control system for an intelligent substation provided by embodiment I of the disclosure, the merging unit and intelligent terminal integrated devices for all the bays in the intelligent substation are accessed to corresponding transport ports of the FPGA access chip of the intelligent power server respectively, and the merging unit and intelligent terminal integrated devices and the transport ports are in a relationship of one-to-one correspondence. In the reception period, the messages are read from each reception buffer clip of the FPGA access chip, and correspondingly processed and then written into the reception buffer clips, by the real-time business CPU. In the transmission period, the real-time business CPU issues the indication information generated in the measurement and control and/or protection process to the FPGA access chip, and GOOSE messages are generated by the FPGA chip according to the indication information and written into the transmission buffer. Messages reception/transmission is realized by the real-time business CPU through the reception buffer/transmission buffer of the FPGA access chip, thereby preventing the real-time reception/transmission of the messages from being influenced due to a heavy load of the real-time business CPU. Therefore, the FPGA access chip is capable of controlling concurrently transmission of messages in the transmission buffer while reading messages to be received from the transport ports, thereby greatly shortening delay of messages transmission and reception, improving real-time property and further alleviating a processing load of the CPU.

Embodiment II

FIG. 3 shows a data transferring method based on a protection and control system for an intelligent substation provided by embodiment II of the disclosure. The embodiment is based on the above embodiment, and is improved on the basis of the above embodiment. Specifically, reception and transmission of message data are improved. As shown in FIG. 3, the data transferring method based on the protection and control system for an intelligent substation provided by embodiment II of the disclosure can include steps described below.

In S310, the real-time business CPU reads messages from each reception buffer clip according to a descending order of the total number of messages of each reception buffer clip.

Illustratively, there exists reception buffer clips with a large amount of buffered messages and reception buffer clips with a small amount of buffered messages because the total numbers of messages stored in each reception buffer clip are different. The real-time business CPU reads messages from each reception buffer clip according to a descending order of the number of total messages buffered in each reception buffer clip of the reception buffer, and reads messages from the reception buffer clip with the maximum number of total messages. Optionally, after reading messages from one reception buffer clip, the real-time business CPU further reads messages from a reception buffer clip with the maximum number of total messages at present. The FPGA access chip 101 can report the total number of messages of each reception buffer clip to the real-time business CPU in the reception period, thereby guaranteeing that the real-time business CPU may know the total number of messages of each reception buffer clip in real time, and further guaranteeing that messages buffered in each reception buffer clip can be received according to the descending order of the total number of messages. A reception strategy of the real-time business CPU may avoid that there are too many messages in some reception buffer clips of the FPGA access chip 101 while there are too few messages in other reception buffer clips, thereby advoiding the condition that an individual reception buffer clip is full in its storage quota because of having stored with a large number of messages, and fails to store new messages.

In S320, the FPGA access chip 101 generates GOOSE messages according to the indication information generated by the real-time business CPU in the measurement and control process and/or the protection process, and writes the messages into corresponding transmission buffer clips according to destination MAC (Media Access Control) address in the GOOSE messages. The destination MAC address is the MAC address of the merging unit and intelligent terminal integrated device 20.

Illustratively, the transmission buffer of the FPGA access chip 101 includes a plurality of transmission buffer clips, and each of the transmission buffer clips corresponds to one Ethernet transport port in the FPGA access chip 101. Optionally, the FPGA access chip 101 writes GOOSE messages into corresponding transmission buffer clips according to the destination MAC addresses in the GOOSE messages. Because each transport port of the FPGA access chip 101 corresponds to one transmission buffer clip and each transport port corresponds to one merging unit and intelligent terminal integrated device, the messages in the transmission buffer clips are written into the corresponding Ethernet transport ports and directly transmitted to the corresponding merging unit and intelligent terminal integrated devices through the transport ports in the message transmitting process.

According to the data transferring method based on the protection and control system for an intelligent substation provided by the embodiment of the disclosure, in the reception period of messages data, the messages are read from each reception buffer clip according to the descending order of the total number of the messages in the reception buffer clips, thereby avoiding the condition that an individual reception buffer clip is full in its storage quota because of having stored with a large number of messages and fails to store new messages. In the transmission period of messages data, the FPGA access chip writes GOOSE messages into corresponding transmission buffer clips according to the destination MAC addresses in the GOOSE messages, which guarantees that the GOOSE messages can be written into corresponding transmission buffer clips, thereby improving the efficiency of writing messages. In conclusion, with the above technical solution, the message processing efficiency can be improved in both of the reception period and the transmission period, thereby improving the data transfer efficiency of the whole intelligent substation and further guaranteeing high-efficiency operation of the intelligent substation.

Embodiment III

Embodiment III of the disclosure provides a data transferring method based on the protection and control system for an intelligent substation. The embodiment is based on the above embodiments, and is improved on the basis of the above embodiments. Specifically, reading messages by the real-time business CPU is improved. Similarly, by referring to FIG. 2, the data transferring method based on the protection and control system for an intelligent substation provided by embodiment III of the disclosure can include steps described below.

A current task is interrupted and the GOOSE messages are read from a reception buffer clip in which the number of the GOOSE messages exceeds a first preset threshold when a notification message transmitted by the FPGA access chip 101 is received by the real-time business CPU. The FPGA detects the number of the GOOSE messages written into each reception buffer clip. If it is detected that the number of the GOOSE messages written into the reception buffer clip exceeds the first preset threshold, the notification message is transmitted for notifying that the number of the GOOSE messages in the reception buffer clip exceeds the first preset threshold.

Illustratively, under normal conditions, the GOOSE messages are retransmitted once every several milliseconds on the side of the merging unit and intelligent terminal integrated device 20, and the number of the generated GOOSE messages is small. However, when faults occur, a plurality of switching semaphores deflect, thereby generating high data traffic. When lots of GOOSE messages are transmitted by a merging unit and intelligent terminal integrated device 20, it indicates that faults occur at bays corresponding to the above merging unit and intelligent terminal integrated device 20, and the intelligent power server 10 should respond in time. In order to respond to the faults in time, the FPGA access chip 101 identifies the type of messages while reading the messages from the transport ports, and the number of the GOOSE messages in corresponding reception buffer clip is increased by one if the message is the GOOSE message. The FPGA access chip 101 detects the number of the GOOSE messages written into each reception buffer clip, and transmits the notification message to the real-time business CPU if it is detected that the number of the GOOSE messages written into the reception buffer clips exceeds the first preset threshold, thereby notifying that the number of the GOOSE messages in the reception buffer clips exceeds the first preset threshold.

Optionally, the first preset threshold can be preset in actual operations according to the actual number of the GOOSE messages generated during fault occurrence on the side of the merging unit and intelligent terminal integrated device 20. For example, the first preset threshold can be a mean value of the actual number of the GOOSE messages generated during fault occurrence. The real-time business CPU is actively notified to preferably read GOOSE messages from a certain reception buffer clip if it is detected by the FPGA access chip 101 that the number of the GOOSE messages in the reception buffer clip is suddenly increased to exceed the first preset threshold. After a notification of the first FPGA access chip 101 is received by the real-time business CPU, the current task is interrupted, and the GOOSE messages are preferably read from the reception buffer clip and then the interrupted task is returned to be continuously processed.

Further, execution of the interrupted current task is resumed if the number of the GOOSE messages in the reception buffer clip is lower than the first preset threshold by reading the GOOSE messages via the real-time business CPU.

Illustratively, the real-time business CPU interrupts the currently operated task upon receiving the notification of the FPGA access chip 101, and preferably reads GOOSE messages from the reception buffer clip in which the number of the GOOSE messages exceeds the first preset threshold. After the GOOSE messages are read each time, the FPGA access chip 101 decreases the number of the GOOSE messages in the corresponding reception buffer clip by one, and reports the number of the GOOSE messages in the current reception buffer clip in real time. When the number of the GOOSE messages in the reception buffer clip is lower than the first preset threshold by reading the GOOSE messages via the real-time business CPU, the number of the GOOSE messages in the reception buffer clip is a normal value, and the real-time business CPU does not need to preferably read the GOOSE messages from the reception buffer clip, and then the real-time business CPU resumes to execute the interrupted current task.

Further, execution of the interrupted current task is resumed if the number of the GOOSE messages in the reception buffer clip is lower than a second preset threshold by reading the GOOSE messages via the real-time business CPU, where the second preset threshold is smaller than the first preset threshold.

Illustratively, when the number of the GOOSE messages in the reception buffer clip is lower than the first preset threshold by reading the GOOSE messages via the real-time business CPU, although the number of the GOOSE messages in the reception buffer clip at this time is a normal value, there are still a larger number of GOOSE messages. Moreover, lots of GOOSE messages are generated in a short time and stored in the reception buffer clip due to faults on the side of the merging unit and intelligent terminal integrated devices 20. Therefore, the real-time business CPU may interrupt the current task again, and therefore, execution of the interrupted current task may be resumed only when the number of the GOOSE messages in the reception buffer clip is lower than the second preset threshold by reading the GOOSE messages via the real-time business CPU. It should be understood that, the second preset threshold is a numerical value less than the first preset threshold. Since execution of the interrupted current task may be resumed only when the number of the GOOSE messages in the reception buffer clip is lower than the second preset threshold by reading the GOOSE messages via the real-time business CPU, the real-time business CPU can read a large number of GOOSE messages in the reception buffer clip, the number of the GOOSE messages remained in the reception buffer clip is relatively small, and the condition that lots of GOOSE messages are generated in a short time due to the faults on the side of the merging unit and intelligent terminal integrated devices 20 can be coped.

With the above technical solution, the GOOSE messages in the reception buffer clip of which the message number exceeds the first preset threshold value can be preferably processed when lots of GOOSE messages are generated due to faults, thereby guaranteeing that the GOOSE messages are processed in time, guaranteeing normal use of the reception buffer clips and further guaranteeing smooth data transfer.

Embodiment IV

Embodiment IV of the disclosure provides a data transferring method based on the protection and control system for an intelligent substation. The embodiment is based on the above embodiments, and is improved on the basis of the above embodiments. Specifically, the operating process of a non-real-time business CPU is described. Similarly, by referring to FIG. 2, the data transferring method based on the protection and control system for an intelligent substation provided by embodiment IV of the disclosure can include steps described below.

The non-real-time business CPU collects report information generated by the real-time business CPU in the measurement and control process and/or the protection process, converts MAC addresses of the merging unit and intelligent terminal integrated devices in the report information into the IP addresses of the merging unit and intelligent terminal integrated devices, and transmits the processed information to a station level device through a switch in the intelligent power server. The reporting information may be an action report and other information.

Illustratively, the real-time business CPU will generate the report information in the measurement and control process and/or the protection process, the report information can include measurement and control information and/or protection information, the MAC addresses of the merging unit and intelligent terminal integrated devices 20 in the report information are converted into the IP addresses of the merging unit and intelligent terminal integrated devices 20, and then the report information is transmitted to the station level device through the switch in the intelligent power server 10. Optionally, the station level device can include an operator workstation or a monitoring host, and the intelligent power server 10 is connected to the station level device through the switch provided therein. Specifically, the station level device can identify the IP addresses of the merging unit and intelligent terminal integrated devices 20, while collection of the measurement and control information and protection information of the merging unit and intelligent terminal integrated devices 20 by the intelligent power server 10 is implemented by a manner of identifying the MAC addresses of the merging unit and intelligent terminal integrated devices 20. Therefore, the intelligent power server 10 can assign the IP address for the accessed merging unit and intelligent terminal integrated devices 20, the IP address is unique, and a mapping relation between the MAC addresses of the merging unit and intelligent terminal integrated devices and the IP addresses is stored, thereby forming a mapping table between the MAC addresses and the IP address. Based on the mapping relation, the MAC addresses in the measurement and control information and the protection information are replaced with corresponding IP addresses, and the measurement and control information and acquisition protection information carrying the IP addresses may be transmitted to the station level device through the switch, thereby guaranteeing that the station level device confirms a source address of the measurement and control information and protection information and other processing information.

Optionally, the non-real-time business CPU collects the report information generated by the real-time business CPU in the measurement and control process and/or the protection process, and MMS messages are generated and transmitted to the station level device through the switch in the intelligent power server 10.

Specifically, the real-time business CPU generates the report information in the measurement and control process and/or the protection process according to messages from the merging unit and intelligent terminal integrated devices 20 and adds the MAC addresses of the merging unit and intelligent terminal integrated devices 20 into the report information. When implementing the telecontrol function, the non-real-time business CPU collects the report information generated in the measurement and control process and/or the protection process, converts the MAC addresses of the merging unit and intelligent terminal integrated devices 20 into the IP addresses to be carried in the MMS messages and transmits the IP addresses to the station level device, so that the station level device can manage the merging unit and intelligent terminal integrated devices 20 according to the IP addresses of the merging unit and intelligent terminal integrated devices 20. For example, every time after a control operation is terminated, the intelligent power server 10 will transmit a message report to notify a result of the present operation to the station level device, such as a control operation termination report. After processing the GOOSE messages, the intelligent power server 10 transmits an action signal report, such as a cascade differential action.

With the above technical solution, the non-real-time business CPU converts the MAC addresses of the merging unit and intelligent terminal integrated devices in the report information into the IP addresses, thereby guaranteeing management of the station level device on the merging unit and intelligent terminal integrated devices. The intelligent power server assigns a unique IP address to the merging unit and intelligent terminal integrated device accessed to the intelligent substation by converting the MAC addresses into the IP address, so that cloud control and cloud business of the substation can be realized, thereby laying a technical basis for development of big energy data and energy Internet.

Optionally, the data transferring method can further include:

remote control commands transmitted from the station level device are received by the non-real-time business CPU through the switch in the intelligent power server 10; and the remote control commands, after being processed and converted, are transmitted by the non-real-time business CPU to the merging unit and intelligent terminal integrated devices 20 through the FPGA access chip 101.

Illustratively, the non-real-time business CPU can be further configured to receive remote control commands transmitted from the station level device to the merging unit and intelligent terminal integrated devices 20 through the switch in the intelligent power server 10, and transmit the remote control commands to the merging unit and intelligent terminal integrated devices 20 through the FPGA access chip 101 in the intelligent power server 10 after the remote control commands are processed and converted, thereby guaranteeing remote control of the station level device on the merging unit and intelligent terminal integrated devices 20 and further realizing the telecontrol function of the intelligent power server.

Optionally, the data transferring method can further include:

the FPGA access chip 101 forwards the SV messages or GOOSE messages received from each merging unit and intelligent terminal integrated device 20 to a network analyzer through the switch in the intelligent power server 10.

Illustratively, the network analyzer and the intelligent power server 10 are separately arranged in the intelligent substation, and the FPGA access chip 101 can forward the SV messages or GOOSE messages received from each merging unit and intelligent terminal integrated device 20 to the network analyzer through the switch in the intelligent power server 10, thereby realizing the network analysis function of the intelligent substation.

Optionally, the data transferring method can further include:

the FPGA access chip 101 forwards the SV messages or GOOSE messages received from each merging unit and intelligent terminal integrated device 20 to a fault recorder through the switch in the intelligent power server 10.

Illustratively, the fault recorder and the intelligent power server 10 are separately arranged in the intelligent substation, and the FPGA access chip 101 can forward the SV messages or GOOSE messages received from each merging unit and intelligent terminal integrated device 20 to a fault recorder through the switch in the intelligent power server 10, thereby realizing a fault recording function of the intelligent substation.

Please note that the intelligent terminals in the merging unit and intelligent terminal integrated devices are intelligent assemblies. The intelligent terminals are connected to primary devices, such as a circuit breaker, knife switch and main transformer and the like, through cables, and connected to secondary devices for protecting, measuring and controlling and the like through optical fibers, so as to achieve measurement function, control function and the like over the primary devices. Specifically, the intelligent terminals mainly have the following functions:

receiving control instructions for trip protection and tripping;

receiving and executing opening/closing control instructions from a measuring and control device;

uploading position signals of knife switches; collecting and uploading temperature data/humidity data.

It should be noted that, the above descriptions are only embodiments and used technical principles of the disclosure. Those skilled in the art may understand that the disclosure is not limited to specific embodiments herein, and those skilled in the art may carry out various apparent modifications, readjustments and replacements without departing from the protection scope of the disclosure. Therefore, although the disclosure is described in details through the above embodiments, the disclosure is not only limited to the above embodiments, and also can include more other equivalent embodiments in case of not deviating from the conception of the disclosure, while the scope of the disclosure is determined by the scope of the attached claims.

What is claimed is:

1. A data transferring method based on a protection and control system for an intelligent substation, wherein merging unit and intelligent terminal integrated devices for all bays in the intelligent substation are directly accessed to an intelligent power server, each of the merging unit and intelligent terminal integrated devices is accessed to one of transport ports of a field-programmable gate array (FPGA) access chip on the intelligent power server through an embedded high-bandwidth switched communication network, and the merging unit and intelligent terminal integrated devices and the transport ports are in a relationship of one-to-one correspondence, wherein the intelligent power server is configured to realize all functions of measurement and control, protection, switching and telecontrol in the intelligent substation, and the method comprises:

in a reception period of a real-time business central processor of the intelligent power server, reading, by the real-time business central processor, at least one of sampled value SV messages and generic object oriented substation events GOOSE messages transmitted by each of the merging unit and intelligent terminal integrated devices from each reception buffer clip of the FPGA access chip, wherein the SV messages or GOOSE messages are received from each of the transport ports by the FPGA access chip, subjected to a SV processing or GOOSE processing, and then written into corresponding reception buffer clips in a reception buffer, wherein the reception buffer clips and the transport ports are in a relationship of one-to-one correspondence;

in a transmission period of the real-time business central processor, issuing, by the real-time business central processor, indication information generated in at least one of a measurement and control process and a protection process to the FPGA access chip, causing the FPGA access chip to generate the GOOSE messages according to the indication information and write the GOOSE messages into a transmission buffer of the FPGA access chip.

2. The data transferring method according to claim 1, wherein the step of reading, by the real-time business central processor, at least one of SV messages and GOOSE messages transmitted by each of the merging unit and intelligent terminal integrated devices from each reception buffer clip of the FPGA access chip comprises:

reading, by the real-time business central processor, messages from each reception buffer clip according to a descending order of a total number of messages in each reception buffer clip, wherein the FPGA access chip reports the total number of messages in each reception buffer clip to the real-time business central processor in the reception period.

3. The data transferring method according to claim 2, wherein the step of reading, by the real-time business central processor, at least one of SV messages and GOOSE messages transmitted by each of the merging unit and intelligent terminal integrated devices from each reception buffer clip of the FPGA access chip further comprises:

interrupting a current task and reading the GOOSE messages from a reception buffer clip in which a number of the GOOSE messages exceeds a first preset threshold when a notification message transmitted by the FPGA access chip is received by the real-time business central processor, wherein the notification message is transmitted by the FPGA access chip if the number of the GOOSE messages written into the reception buffer clip exceeds the first preset threshold, and is used for notifying that the number of the GOOSE messages in the reception buffer clip exceeds the first preset threshold.

4. The data transferring method according to claim 3, wherein execution of the current task interrupted is resumed if the number of the GOOSE messages in the reception buffer clip is lower than the first preset threshold by reading the GOOSE messages via the real-time business central processor.

5. The data transferring method according to claim 3, wherein execution of the current task interrupted is resumed if the number of the GOOSE messages in the reception buffer clip is lower than a second preset threshold by reading the GOOSE messages via the real-time business central processor, wherein the second preset threshold is smaller than the first preset threshold.

6. The data transferring method according to claim 1, wherein the transmission buffer of the FPGA access chip comprises a plurality of transmission buffer clips, wherein the transmission buffer clips and the transport ports are in a relationship of one-to-one correspondence, and the step of causing the FPGA access chip to generate the GOOSE messages according to the indication information and write the GOOSE messages into a transmission buffer of the FPGA access chip comprises:

through the FPGA access chip, generating the GOOSE messages according to the indication information and writing the GOOSE messages into corresponding transmission buffer clips according to a destination media access control (MAC) address in the GOOSE messages.

7. The data transferring method according to claim 1, wherein a duration of the reception period of the real-time business central processor is greater than a duration of the transmission period.

8. The data transferring method according to claim 1, further comprising:

collecting, by a non-real-time business central processor, report information generated by the real-time business central processor in at least one of the measurement and control process and the protection process, converting MAC addresses of the merging unit and intelligent terminal integrated devices in the report information into network protocol IP addresses of the merging unit and intelligent terminal integrated devices, and transmitting the report information to a station level device through a switch in the intelligent power server.

9. The data transferring method according to claim 1, further comprising:

receiving, by a non-real-time business central processor, remote control commands transmitted by the station level device through the switch in the intelligent power server;

transmitting the remote control commands, after being processed and converted by the non-real-time business central processor, to the merging unit and intelligent terminal integrated devices through the FPGA access chip.

10. The data transferring method according to claim 1, further comprising:
    forwarding, by the FPGA access chip, at least one of the SV messages and GOOSE messages received from each of the merging unit and intelligent terminal integrated devices to a network analyzer through the switch in the intelligent power server.

11. The data transferring method according to claim 7, further comprising:
    forwarding, by the FPGA access chip, at least one of the SV messages and GOOSE messages received from each of the merging unit and intelligent terminal integrated devices to a fault recorder through the switch in the intelligent power server.

12. The data transferring method according to claim 8, further comprising:
    forwarding, by the FPGA access chip, at least one of the SV messages and GOOSE messages received from each of the merging unit and intelligent terminal integrated devices to a fault recorder through the switch in the intelligent power server.

13. The data transferring method according to claim 9, further comprising:
    forwarding, by the FPGA access chip, at least one of the SV messages and GOOSE messages received from each of the merging unit and intelligent terminal integrated devices to a fault recorder through the switch in the intelligent power server.

\* \* \* \* \*